(12) United States Patent
Maansaari et al.

(10) Patent No.: US 9,071,461 B2
(45) Date of Patent: *Jun. 30, 2015

(54) CHANGING OF CHANNEL CAPABILITIES

(75) Inventors: Kirsi Maansaari, Oulu (FI); Marko Kokko, Oulu (FI)

(73) Assignee: Wi-LAN, Inc., Ottawa (CA)

( * ) Notice: Subject to any disclaimer, the term of this patent is extended or adjusted under 35 U.S.C. 154(b) by 444 days.

This patent is subject to a terminal disclaimer.

(21) Appl. No.: 12/891,989

(22) Filed: Sep. 28, 2010

(65) Prior Publication Data

US 2011/0013628 A1    Jan. 20, 2011

Related U.S. Application Data

(63) Continuation of application No. 11/925,691, filed on Oct. 26, 2007, now Pat. No. 7,804,837, which is a continuation of application No. 09/963,688, filed on Sep. 27, 2001, now Pat. No. 7,327,736.

(30) Foreign Application Priority Data

Sep. 27, 2000   (FI) ..................................... 20002124

(51) Int. Cl.
| | |
|---|---|
| H04L 12/28 | (2006.01) |
| H04L 12/54 | (2013.01) |
| H04L 12/923 | (2013.01) |
| H04L 12/911 | (2013.01) |
| H04L 12/70 | (2013.01) |

(52) U.S. Cl.
CPC .......... *H04L 12/5695* (2013.01); *H04L 47/762* (2013.01); *H04L 47/822* (2013.01); *H04L 2012/5634* (2013.01)

(58) Field of Classification Search
USPC ................. 370/230–236, 329–352, 389–395, 370/401–466; 709/223–231
See application file for complete search history.

(56) References Cited

U.S. PATENT DOCUMENTS

| | | | |
|---|---|---|---|
| 5,638,365 | A | 6/1997 | Duault et al. |
| 5,638,412 | A | 6/1997 | Blakeney et al. |
| 5,805,301 | A | 9/1998 | Rasanen |
| 5,903,603 | A | 5/1999 | Kennedy et al. |

(Continued)

FOREIGN PATENT DOCUMENTS

| | | |
|---|---|---|
| WO | 98/36589 | 8/1998 |
| WO | 99/39528 | 8/1999 |

(Continued)

OTHER PUBLICATIONS

"Circuit Emulation Service Interoperability Specification," (On Line), AF-SAA-0032.000, ATM Forum Technical Committe, 62 pp. (Sep. 1995).

*Primary Examiner* — Man Phan
(74) *Attorney, Agent, or Firm* — Volpe and Koenig, P.C.

(57) ABSTRACT

In a telecommunications system, in which a connection comprises a part with an interworking function at both ends, a channel is allocated to the connection between the interworking functions. The required channel capabilities may vary during the connection, whereby the channel capabilities should be changed. When the first interworking function detects that a channel capability must be changed, a first message, which indicates the desired capability change, is transmitted (2-1) to the second interworking function; and the channel capability is changed (2-3, 2-5) into the desired one at both ends of the part.

20 Claims, 3 Drawing Sheets

(56) References Cited

U.S. PATENT DOCUMENTS

| | | | |
|---|---|---|---|
| 6,118,759 A | 9/2000 | Ohyoshi et al. | |
| 6,169,735 B1 | 1/2001 | Allen et al. | |
| 6,219,348 B1 | 4/2001 | Allen et al. | |
| 6,256,323 B1 | 7/2001 | Benayoun et al. | |
| 6,266,343 B1 | 7/2001 | Caves | |
| 6,345,048 B1 | 2/2002 | Allen et al. | |
| 6,370,660 B1 | 4/2002 | Mann | |
| 6,404,763 B1 * | 6/2002 | Renucci et al. | 370/352 |
| 6,466,573 B1 * | 10/2002 | Renucci | 370/352 |
| 6,483,820 B1 | 11/2002 | Davidson et al. | |
| 6,512,762 B1 * | 1/2003 | Renucci et al. | 370/352 |
| 6,526,063 B1 | 2/2003 | St-Amand et al. | |
| 6,542,521 B1 | 4/2003 | Fjortoft et al. | |
| 6,546,089 B1 * | 4/2003 | Chea et al. | 379/93.06 |
| 6,553,423 B1 | 4/2003 | Chen | |
| 6,574,313 B1 * | 6/2003 | Chea et al. | 379/93.09 |
| 6,714,532 B1 | 3/2004 | Kawaguchi | |
| 6,738,624 B1 * | 5/2004 | Aksentijevic et al. | 455/452.1 |
| 6,757,278 B1 | 6/2004 | Bi et al. | |
| 6,765,903 B1 | 7/2004 | Allen et al. | |
| 6,771,763 B1 * | 8/2004 | Hagirahim et al. | 379/219 |
| 6,966,063 B1 * | 11/2005 | Meric et al. | 719/321 |
| 6,975,879 B1 * | 12/2005 | Aalto et al. | 455/522 |
| 7,103,668 B1 * | 9/2006 | Corley et al. | 709/231 |
| 2002/0068609 A1 | 6/2002 | Oh et al. | |
| 2005/0041633 A1 * | 2/2005 | Roeser et al. | 370/351 |
| 2006/0187847 A1 | 8/2006 | Pelton et al. | |
| 2007/0223485 A1 * | 9/2007 | Roesser | 370/395.1 |

FOREIGN PATENT DOCUMENTS

| | | |
|---|---|---|
| WO | 00/51387 | 8/2000 |
| WO | 01/11910 | 2/2001 |

* cited by examiner

CHANGING OF CHANNEL CAPABILITIES

CROSS REFERENCE TO RELATED APPLICATION(S)

This application is a continuation of U.S. patent application Ser. No. 11/925,691, filed Oct. 26, 2007, now issued as U.S. Pat. No. 7,804,837, which is a continuation of U.S. patent application Ser. No. 09/963,688, filed Sep. 27, 2001, now issued as U.S. Pat. No. 7,327,736, which is incorporated by reference in its entirety, and which claims the right of priority based on Finland application serial no. 20002124, filed Sep. 27, 2000.

FIELD OF INVENTION

This invention relates to network communications.

BACKGROUND

The invention relates to conveying transport service parameter information in a packet-switched network, which conveys service that is conventionally conveyed in a circuit-switched network. In particular, the invention relates to conveying transport service parameter information in an ATM (Asynchronous Transfer Mode) network. By means of the transport service parameter information, it is possible to control capabilities of a channel allocated to a connection.

Conventionally, speech and data are transferred in a circuit-switched network by allocating a dedicated channel to each connection. The dedicated channel permits to ensure certain quality and reliability. However, a problem with the circuit-switched network is that the channel is reserved for a connection, even though nothing would be transferred. In the packet-switched network a plurality of connections can share the same channel. However, since the end-users want to use familiar circuit-switched devices, these two different transmission technologies have been combined such that circuit-switched devices are used at the user end, but the actual data transmission is carried out by packet switching, for instance, using an ATM-based network. The packet-switched data transmission should be transparent to end-users and end-user applications, such as telephone traffic, ISDN (Integrated Service Digital Network), voice-band data and fax. The end-users require the same reliability and quality of service as when the circuit-switched network is used alone. To this end, various protocols have been standardized internationally, which support voice transfer over the ATM-based network, for instance. ATM Forum's 'Loop Emulation Service Using ATM adaptation layer type 2', or more briefly, 'LES Using AAL2' is one example of these standards.

However, there is a problem that current standards do not include all requirements and needs of service aware transport, such as control of codecs and echo cancellation. For instance, ELCP (Emulated Loop Control Protocol) defined in LES specifications allows exchange of channel allocation messages and user port control messages between an interworking function CP-IWF in an access device of the end-user and an interworking function CO-IWF in a gateway at the other end of the ATM network. However, these messages are not able to signal more detailed information on the state of the network or free capacity between CPIWF and CO-IWF, for instance. In other words, they are not able to convey information on which capabilities the channel should have at any given time. This information is needed, however, in order that the user could be provided with the reliability and quality of the circuit-switched network.

SUMMARY

The object of the invention is thus to provide a mechanism, by which channel-specific transport service parameter information can be conveyed between interworking functions. This is achieved by a method, a system and nodes, which are characterized by what is set forth in the independent claims. The preferred embodiments of the method, the system and the nodes of the invention are disclosed in the attached dependent claims.

The invention is based on detecting a problem and solving it by extending the existing message-based data exchange to cover also channel-specific conveyance of transport service parameter information in such a manner that interworking functions can adjust channel capabilities. The invention has an advantage that thereby it is possible to take into account transport service requirements, i.e. capabilities, set for the channel and to change the channel capabilities from default values after a connection establishment any time a need for a change is detected. In this manner it is possible to make sure that the subscriber will always have a desired service. For instance, if ADPCM (Adaptive Differential Pulse Code Modulation) is configured to default coding for speech, but for instance the digital signal processing capacity of CP-IWF is limited, CP-IWF can request that PCM (Pulse Code Modulation) be used for speech. Even though the user's other simultaneous applications may lose some of the bandwidth as a result of the change in coding, the user will nevertheless receive the desired speech service.

BRIEF DESCRIPTION OF THE DRAWING(S)

In the following the invention will be described in greater detail in connection with reference to the attached drawings, wherein FIG. 1 shows a system according to a first preferred embodiment of the invention;

DETAILED DESCRIPTION OF THE PREFERRED EMBODIMENT(S)

Figure 1:
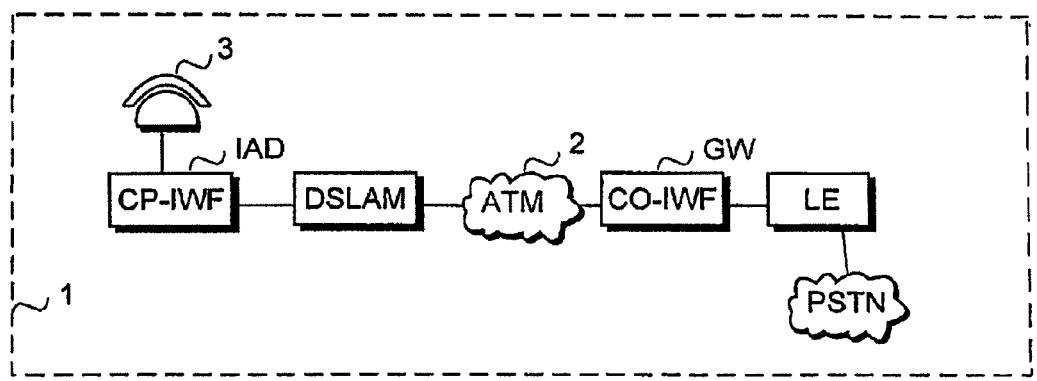

The present invention can be applied in connection with any system, where services are transferred over a circuit-switched or packet-switched network using a protocol with no defined mechanism for data exchange relating to channel capabilities. The invention suits particularly well to systems, in which circuit-switched services are transferred over a packet-switched network. A system of this kind is shown in FIG. 1, for instance, where circuit-switched services are transferred over an ATM-based network using the previously mentioned ELPC between the interworking functions. Even though the invention and its preferred embodiments are described in the following in connection with the system of FIG. 1 and the protocol employed therein, the invention is not restricted thereto, however, but it can be applied e.g. to systems utilizing wireless data transmission.

FIG. 1 shows simplified network architecture of a system 1, in which a service is conveyed to circuit-switched service subscribers via an ATM network 2. In the example of FIG. 1, a connection between subscribers thus comprises two circuit-switched parts and one packet-switched part such that at both ends of the packet-switched part there is an interworking function which adapts circuit-switched and packet-switched data transmission to be mutually compatible.

Between a user terminal, i.e. a subscriber device 3, and an integrated access device IAD it is possible to use data transmission according to PSTN (Public Switched Telephone Network) or ISDN, for instance. Between the integrated access device and DSLAM (Digital Subscriber Line Access Multiplexer) device is used e.g. SDSL (Symmetric Digital Subscriber Line), ADSL (Asymmetric Digital Subscriber Line), HDSL (High-Speed Digital Subscriber Line) or VDSL (Very high speed Digital Subscriber Line) technology. Between a gateway GW and a local exchange LE of the PSTN network it is possible to use V5 data transmission. V5 is a standardized interface between the subscriber network and the local exchange defined by ETSI.

Of the interworking functions, the customer premises inter-working function CP-IWF is located in the integrated access device IAD and the central office interworking function COIWF is part of the gateway GW. In the first preferred embodiment, the above-mentioned LES protocol of the ATM Forum is used between the interworking functions. Both of the interworking functions listen to traffic passing on the channel allocated to a connection. The allocated channel comprises two sub-channels: a speech channel and a signaling channel. On the basis of the listening the interworking function is able to conclude what kind of a connection is required, and triggers, when needed, a functionality described in greater detail in FIGS. 2, 3, 4 and 5. The same functionality can also be triggered by the fact that the operator may have provided the connection with a level (i.e. the desired capabilities) that differs from the level indicated by the default values of parameters. For instance, the capabilities may have been provided in CO-IWF or CP-IWF. The interworking function may also receive from a network element information that triggers the functionality presented in FIGS. 2, 3, 4 and 5. For instance, CO-IWF may receive from the local exchange LE additional information that triggers the changing of channel capabilities.

The system and its network nodes implementing the functionality of the present invention comprise, in addition to prior art means, means for implementing functionalities described in greater detail in connection with FIGS. 2, 3, 4 and 5. To put it more precisely, they comprise means for changing connection parameters (i.e. channel capabilities). The present network nodes comprise processors and memory, which can be utilized in operations according to the invention. All changes necessary for implementing the invention can be executed as added or updated software routines, with application-specific circuits (ASIC) and/or programmable circuits (EPLD, FPGA).

FIGS. 2, 3, 4 and 5 show data transmission according to the invention in a first preferred embodiment, in which it is assumed that CO-IWF is a so-called master. In the first preferred embodiment, when CP-IWF desires to change a connection parameter/connection parameters, it transmits to CO-IWF a request, to which CO-IWF responds with a command. When CO-IWF desires to change a connection parameter/connection parameters, it transmits a command directly to CP-IWF. This has an advantage that the master-slave position is stable and it is known which one makes a decision on the quality of the connection.

Figure 2:
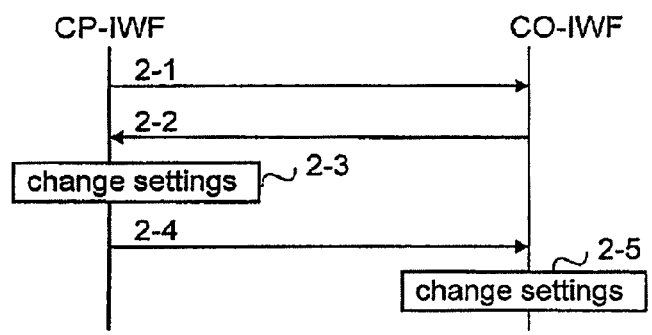
FIGS. 2 and 3 show message-based data transmission according to the first preferred embodiment of the invention.

In FIG. 2, the process starts in a situation, where a channel has already been allocated to a connection. In other words, a speech path is available between the user device and the local exchange shown in FIG. 1, and the connection has been established at default values configured for the parameters. CP-IWF desires to change a parameter reserved for the connection, for instance, for the reason that the quality of the connection has changed, because a fax machine was added to the connection. Therefore, CP-IWF transmits a channel request 2-1 to CO-IWF. The channel request preferably comprises the following elements in the following order: protocol discriminator, channel reference number, message type, information transfer capability, cause and channel parameters. These elements will be described in greater detail later on in the text. Either one of the elements, channel parameters or information transfer capability, can be omitted in the first preferred embodiment of the invention.

After receiving the message 2-1, CO-IWF checks whether it is able to provide the requested channel capabilities. In the example of FIG. 2, it is assumed that it is. Consequently, CO-IWF transmits a channel command 2-2. The channel command preferably comprises the following elements in the following order: protocol discriminator, channel reference number, message type, information transfer capability and channel parameters. Also in this message either one of the elements, channel parameters or information transfer capability, can be omitted in the first preferred embodiment of the invention. In the example of FIG. 2, CO-IWF takes the channel parameters and/or the contents of the information transfer capability directly from the channel request 2-1 for the message 2-2. If CO-IWF is not able to provide the requested parameters it may provide other values in the message 2-2. In another embodiment of the invention CO-IWF may provide other values in the message 2-2, for the reason, for instance, that while listening to the connection, it has detected that the requested channel capabilities do not meet with the channel capabilities required by the connection.

After receiving the message 2-2, CP-IWF checks whether it is able to provide the capabilities requested in the message 2-2. In the example of FIG. 2, it is assumed that it is. So, CO-IWF makes the requested changes in settings at step 2-3 and transmits a channel acknowledgment 2-4 to CO-IWF. The acknowledgment message preferably comprises the following elements in the following order: protocol discriminator, channel reference number and message type.

After receiving the acknowledgment 2-4, CO-IWF makes the corresponding changes in its settings, whereafter the connection has new parameters in its use. Thus, the channel capabilities have been changed to meet the need.

The meaning of the elements used in the messages of FIG. 2 is as follows:

the protocol discriminator is the first part of all messages, also of prior art messages;

the channel reference number is used for connection identification after the channel has been allocated and the connection established. In prior art messages the channel is identified by a channel allocation reference. Because connection parameters can be changed at any step of the connection, it is advantageous to identify the connection in a novel manner;

the message type refers to the name of the message according to the prior art.
A new value for each new message needs to be defined for the message type;

in connection with ISDN calls, the information transfer capability supports detecting content type (e.g. speech, video, audio) of the calls. For instance, the Information Transfer Capability part of the Bearer Capability Information element as defined in ITU-T recommendation 4.93 1 can be used as the information transfer capability element; the cause refers to the source from which the service is selected. the value of the cause element can be e.g. a provided service, a call phase service or no resources available;

the channel parameter identifies the requested service in a greater detail.

Figure 3:
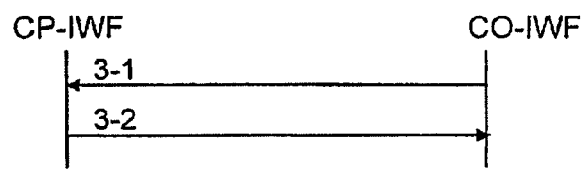

In FIG. 3, the starting step is a situation, where a channel has already been allocated to the connection. After receiving additional information on the quality of the connection, for instance as a result of monitoring, CO-IWF desires to change a parameter reserved for the connection, having first checked that its resources allow the parameter change. For changing the channel capabilities, CO-IWF transmits a channel command 3-1. The channel command has been described in greater detail in connection with FIG. 2. This time, CO-IWF itself gives the contents of the channel parameters element and/or the information transfer capability element.

After receiving the message 3-1, CP-IWF checks whether it is able to provide the capabilities requested in the message 3-1. In the example of FIG. 3, it is assumed that it is not. So, CP-IWF transmits a channel reject message 3-2 to CO-IWF. The channel reject message preferably comprises the following elements in the following order: protocol discriminator, channel reference number, message type and cause. The meanings of the elements have been explained above in connection with FIG. 2.

After receiving the channel reject message, CO-IWF can transmit a new command to CP-IWF with new parameter values.

Signaling according to FIGS. 2 and 3 can be triggered at any step of the connection. It is sufficient that the interworking function receives additional information on the quality of the established connection or on a change in the quality and detects that a capability or capabilities of the channel must be changed. The channel capability/capabilities can be changed several times, if necessary.

The use of the messages according to the first preferred embodiment presented in FIGS. 2 and 3 requires that the standard ELCP be extended by adding thereto the messages shown in the figures with their new elements. In addition, four new values (i.e. one new value/one new message) indicating the above-mentioned messages must be added to the existing 'message type' parameter. An advantage with the first preferred embodiment is that with slight changes in the existing protocol it is possible to provide a message-based transmission mechanism, by which the capabilities of the channel allocated to the connection can be changed.

Between the messages and/or operations shown in FIGS. 2 and 3 it is possible to transmit other messages and/or perform other operations. The messages and the operations are not in an absolute order, but e.g. the message 2-4 can be transmitted at the same time with or prior to the change of settings of step 2-3. The elements included in the messages are not in any absolute temporal order either, but their order can be changed. The messages need not include all the above-described elements either. One element can also convey more information than what is presented above. For instance, the data of the above-mentioned two different elements can be combined into one element. Correspondingly, the data transmitted in the abovementioned one element can be conveyed by a plurality of elements. The above messages are only examples and may comprise a plurality of separate messages for transferring the same information. Other information can also be transferred in the messages. For instance, a reject message may contain information on what kind of a capability change would be possible. The message names can also differ from the above names. The same information can also be transmitted as a part of some old message by adding the necessary element(s) thereto. The messages can also be messages of another protocol.

Figure 4:
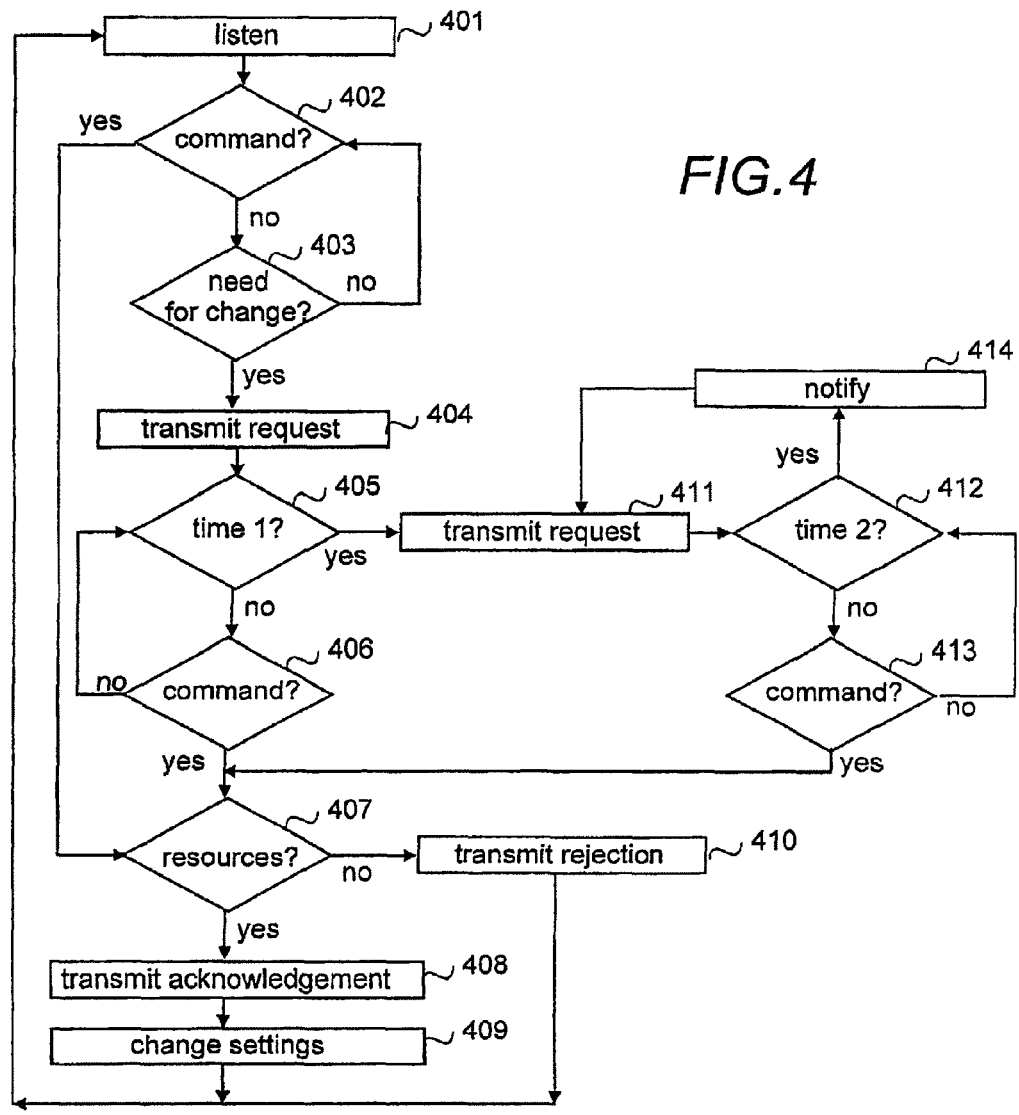
FIG. 4 shows operation in CP-IWF according to the first preferred embodiment of the invention.

FIG. 4 is a flow chart of the operation of CP-IWF in the first preferred embodiment of the invention after a channel has already been allocated to the connection. At step 401, CP-IWF listens to the speech and signaling channels of the channel monitoring whether it receives a command (step 402) or detects a need for changing the channel capabilities (step 403). If CPIWF detects the need, it transmits a request to CO-IWF at step 404 and starts monitoring time (405) and whether it receives a command within the time 1 (step 406). If CP-IWF receives the channel command within the time 1, it checks at step 407 whether it has resources to provide the requested capabilities. If it has the resources, CP-IWF transmits an acknowledgment to CO-IWF at step 408 and changes settings at step 409. Thereafter, CP-IWF returns to step 401 to listen to the channel.

If CP-IWF does not have the necessary resources (step 407), it transmits a rejection to CO-IWF at step 410 and returns to step 401 to listen to the channel.

If the time 1 expires (step 405) prior to the reception of the command, CP-IWF retransmits the request at step 411. Thereafter, CP-IWF starts monitoring the time (step 412) and whether it receives the command within the time 2 (step 413). The time 2 can differ in length from the time 1. If CP-IWF receives the command within the time 2, it proceeds to step 407 to check whether it has resources to provide the requested capabilities.

If the time 2 expires (step 412) prior to the reception of the command, CP-IWF transmits information thereon to a resource management entity or a management device of the integrated access device at step 414 and proceeds thereafter to step 411 to retransmit the request. These two different times are used in the first preferred embodiment both to ensure that the packet containing the request can be delivered and to serve as an accessory of the resource management entity to provide it with information if there is something wrong with the system. Information is not transmitted if one packet is lost.

If the command is received at step 402, CP-IWF proceeds to step 407 to check its resources.

CP-IWF executes the above-described steps until the channel allocated to the connection is released by deallocation message exchange.

Figure 5:
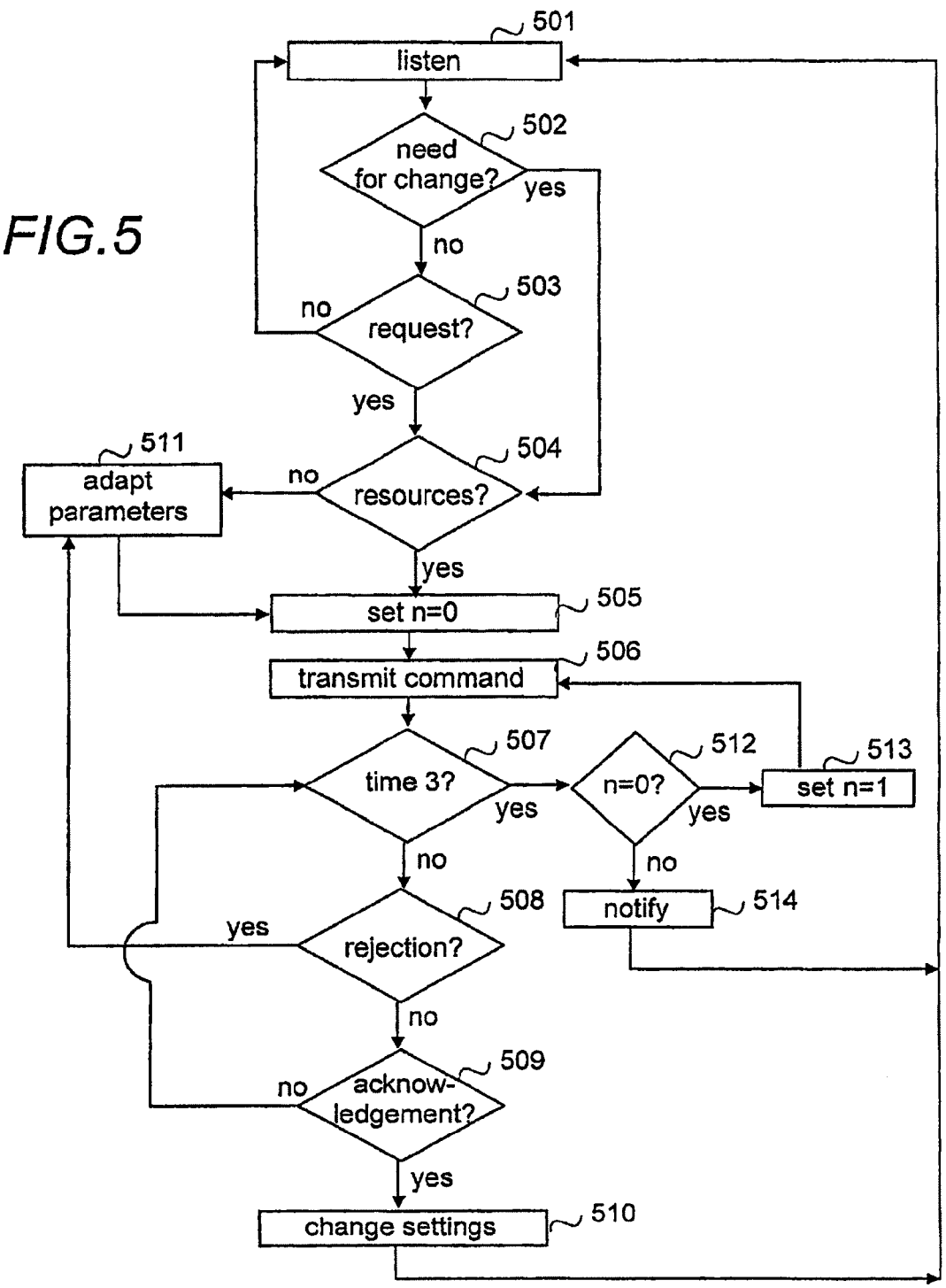
FIG. 5 operation in CO-IWF according to the first preferred embodiment of the invention.

FIG. 5 is a flow chart of the operation of CP-IWF in the first preferred embodiment of the invention after a channel has already been allocated to the connection. At step 501 CO-IWF listens to the speech and signaling channels of the channel monitoring whether it detects a need to change channel capabilities (502) or receives a request (step 503). If CO-IWF detects a need (502) or receives a request (step 503), it checks at step 504 whether it has resources to provide the requested capability/capabilities. If it has resources, CO-IWF sets a time counter n to zero at step 505 and transmits a command to CP-IWF at step 506. Thereafter CO-IWF starts monitoring time (step 507) and whether it receives a rejection (step 508) or an acknowledgment (step 509) within the time 3. The time 3 may differ in length from the times 1 and 2 mentioned in connection with FIG. 4. If CO-IWF receives the acknowledgment (509) within the time 3, it changes the settings at step 510. Thereafter CO-IWF reverts to step 501 to listen to the channel.

If CO-IWF receives the rejection (step 508) within the time 3, it proceeds to step 511, where it adapts the connection parameters to meet with its resources. Thereafter CO-IWF continues from step 505 by setting the time counter n to zero. The time counter is used both to ensure that the packet containing the command can be delivered and to serve as an accessory of the resource management entity to provide it with information if there is something wrong with the system. Information is not transmitted if one packet is lost.

If the time 3 expires (step 507) prior to the reception of the acknowledgment or the rejection, CO-IWF checks the value of the time counter n. If n is zero (step 512), CO-IWF sets the time counter n to one at step 513 and proceeds thereafter to step 506 to retransmit the channel request. If the value of the time counter n is not zero (step 512), CO-IWF transmits information thereon to the gateway resource management entity or management device at step 514 and proceeds to step 501 to listen to the channel. If the command transmission was triggered by a detected need for change, the command is retransmitted, because the need for change still exists (step 502). If the command was transmitted in response to a request, steps 501, 502 and 502 will be repeated.

If CO-IWF detects at step 504 that its resources are not sufficient to provide the necessary or requested capabilities, CO-IWF proceeds to step 511 to adapt the parameters to meet with the resources.

CO-IWF executes the above-described steps until the channel allocated to the connection will be released by deallocation message exchange.

The order of the steps shown in FIGS. 4 and 5 may deviate from what is described above, and the steps may take place in parallel. Between the steps it is possible to execute other steps that have not been shown in the figures, and some of the steps appearing in the figures can also be omitted, such as steps 414 and 514. Some of the steps can also be replaced by an alternative solution that produces the same outcome. The time counter of FIG. 5 is an alternative to monitoring two different times as in FIG. 4.

In a second preferred embodiment, neither of the interworking functions is assumed to be the master. In the second preferred embodiment, when the interworking function detects a need for change, it checks for which kind of channel capabilities it has free resources and transmits a channel command to a second interworking function, whereafter it remains waiting for a rejection or an acknowledgment for a given period of time, or possibly retransmits the command. In the second preferred embodiment, the functionalities of both interworking functions are thus similar. The message exchange shown in FIGS. 2 and 3 changes such that the message 2-1 is not transmitted, but both interworking functions can transmit the other messages. In the second preferred embodiment, the functionalities shown in FIGS. 4 and 5 are combined for example such that from step 403 of FIG. 4 the process proceeds to step 504 of FIG. 5 to check the available resources, when a need is detected to change channel capability/capabilities. In the second preferred embodiment the channel command can be replaced by a channel request.

Also in a third preferred embodiment of the invention, the functionalities of both interworking functions are similar. In the third preferred embodiment of the invention, the interworking function which detects a need to change parameters transmits a channel request, i.e. acts in the same way as CP-IWF in the first preferred embodiment of the invention. Correspondingly, the interworking function which receives the request acts in the same way as CO-IWF in the first preferred embodiment of the invention.

Even though the invention is described in the above assuming that one interworking function is a customer premises interworking function and the other is a central office interworking function, the invention can also be applied between two customer premises interworking functions or between two central office interworking functions.

Even though the invention is described in the above assuming that both interworking functions are located in network nodes, all embodiments of the invention can also be applied if one of the interworking functions is located in the network node (being the host according to the first preferred embodiment) and the other is located in an end-user device or in a device to which the end-user device is directly coupled. Both of these devices are referred to as terminal devices in the present document. In that case there is no circuit-switched network between the end-user and the interworking function, but the part between the user interface and the interworking function can be regarded as the circuit-switched part of the connection, because it is based on circuit-switching. The second and the third preferred embodiments of the invention can also be applied when neither of the interworking functions is located in the network node, but instead in an end-user device or in a device to which the end-user device is directly coupled.

Even though the invention is described in the above by means of an example of a system, in which the connection comprises two circuit-switched parts and therebetween a packet-switched part, with an interworking function at both ends, which interworking function adapts circuit-switched data transmission and packet-switched data transmission to one another, the invention is not restricted to these systems. The connection may also comprise one circuit-switched part and one or two packet-switched parts. There may also be more than two or three parts. All parts can be either circuit-switched or packet-switched. Different parts can use different data transmission technologies, for instance, one packet-switched part can use ATM technology and the other packet-switched part can use IP (Internet Protocol) technology. The interworking function that is located between two different parts (e.g. an ATM part and an IP part, or a circuit-switched part and a packet-switched part) adapts the data transmission methods and technologies to one another. The interworking function between two similar parts, in turn, does not adapt two different data transmission methods or technologies to one another but it works together with the interworking function at one end of either part. In the present document, the interworking function covers both the functionality of adapting two different data transmission methods or technologies to one another and the functionality of participating in channel allocation at one end of the part, which supports the same protocol as the interworking function adapting two different functionalities to one another at the other end of the part.

It is apparent to a person skilled in the art that as technology progresses the basic idea of the invention can be implemented in a variety of ways. Thus, the invention and its embodiments are not restricted to the above-described examples, but they may vary within the scope of the claims.

What is claimed is:

1. A method for use in a first interworking function for communicating with a second interworking function, the method comprising:
    detecting, at the first interworking function, that a channel capability change is desirable by monitoring a channel allocated to a connection;
    transmitting, to the second interworking function, a first message that indicates that the channel capability change is desirable;
    receiving a second message from the second interworking function indicating whether the channel capability change can or cannot be performed; and
    on a condition that the channel capability change cannot be performed, the first interworking function re-transmitting the first message after a predetermined time period, or the first interworking function receiving, from the second interworking function, an indication of a new desired capability change that can be performed at the second interworking function.

2. A first network device for communicating via a communication channel with a second network device that includes a second interworking function, the first network device comprising:
a first interworking function configured to detect that a channel capability change is desirable by monitoring a channel allocated to a connection;
a transmitter configured to transmit, to the second interworking function, a first message that indicates that the channel capability change is desirable;
a receiver configured to receive a second message from the second interworking function indicating whether the channel capability change can or cannot be performed; and
the first interworking function being further configured to, on a condition that the channel capability change cannot be performed, re-transmit the first message after a predetermined time period, or receive, from the second interworking function, an indication of a new desired capability change that can be performed at the second interworking function.

3. The method of claim 1, wherein the second message is a channel reject message.

4. The method of claim 3, wherein the channel reject message includes at least one of: a protocol discriminator, a channel reference number, a message type, or a cause.

5. The method of claim 1, further comprising, on a condition that the channel capability change cannot be performed, the first interworking function transmitting a third message that indicates that the channel capability change is desirable, the third message including at least one new parameter value associated with the desired channel capability change.

6. The method of claim 1, wherein on a condition that the channel capability change can be performed, receiving, from the second interworking function, a channel command.

7. The method of claim 6, wherein the channel command includes at least one of: a protocol discriminator, a channel reference number, a message type, an information transfer capability, or a channel parameter.

8. The method of claim 7, further comprising transmitting, to the second interworking function in response to the channel command, a channel acknowledgement.

9. The method of claim 8, wherein the transmitting the channel acknowledgement is performed on a condition that the first interworking function is capable of providing capabilities identified in the channel command.

10. The method of claim 1, wherein at least one of the first interworking function or the second interworking function is included in an end-user device.

11. The method of claim 1, wherein at least one of the first interworking function or the second interworking function is included in a device coupled with an end user.

12. The first network device of claim 2, wherein the second message is a channel reject message.

13. The first network device of claim 12, wherein the channel reject message includes at least one of: a protocol discriminator, a channel reference number, a message type, or a cause.

14. The first network device of claim 2, wherein on a condition that the channel capability change cannot be performed, the transmitter is further configured to transmit a third message that indicates that the channel capability change is desirable, the third message including at least one new parameter value associated with the desired channel capability change.

15. The first network device of claim 2, wherein on a condition that the channel capability change can be performed, the receiver is further configured to receive, from the second interworking function, a channel command.

16. The first network device of claim 15, wherein the channel command includes at least one of: a protocol discriminator, a channel reference number, a message type, an information transfer capability, or a channel parameter.

17. The first network device of claim 16, wherein the transmitter is further configured to transmit, to the second interworking function in response to the channel command, a channel acknowledgement.

18. The first network device of claim 17, wherein the transmitter is further configured to transmit the channel acknowledgement on a condition that the first interworking function is capable of providing capabilities identified in the channel command.

19. The first network device of claim 2, wherein at least one of the first network device or the second network device is an end-user device.

20. The first network device of claim 2, wherein at least one of the first network device or the second network device is a device coupled with an end user.

* * * * *